US011363440B2

(12) United States Patent
Dickmann et al.

(10) Patent No.: US 11,363,440 B2
(45) Date of Patent: Jun. 14, 2022

(54) COMMUNICATION DEVICE HAVING A WIRELESS INTERFACE (71) Applicant: SONOVA AG, Staefa (CH)

(72) Inventors: Georg Dickmann, Ebmatingen (CH); Daniel Lucas-Hirtz, Rapperswil (CH)

(73) Assignee: Sonova AG, Staefa (CH)

( * ) Notice: Subject to any disclaimer, the term of this patent is extended or adjusted under 35 U.S.C. 154(b) by 170 days.

(21) Appl. No.: 16/635,321

(22) PCT Filed: Aug. 11, 2017

(86) PCT No.: PCT/EP2017/070489
§ 371 (c)(1),
(2) Date: Jan. 30, 2020

(87) PCT Pub. No.: WO2019/029826
PCT Pub. Date: Feb. 14, 2019

(65) Prior Publication Data
US 2020/0162883 A1 May 21, 2020

(51) Int. Cl.
*H04W 8/00* (2009.01)
*H04M 1/60* (2006.01)
(Continued)

(52) U.S. Cl.
CPC ......... *H04W 8/005* (2013.01); *H04M 1/6066* (2013.01); *H04W 4/80* (2018.02);
(Continued)

(58) Field of Classification Search
CPC ....... H04W 8/005; H04W 76/14; H04W 4/80; H04W 72/0473; H04W 84/18; H04M 1/6066; H04M 2250/02
See application file for complete search history.

(56) References Cited

U.S. PATENT DOCUMENTS 8,295,766 B2   10/2012   Zimbric et al.
9,107,026 B1 *  8/2015   Viswanadham ...... H04W 8/005
(Continued)

FOREIGN PATENT DOCUMENTS

EP   2188903   5/2010
EP   1855206   4/2013
(Continued)

OTHER PUBLICATIONS

International Search Report and Written Opinion received in International Application No. PCT/US17/070489, dated Mar. 13, 2018.

*Primary Examiner* — Asghar H Bilgrami
(74) *Attorney, Agent, or Firm* — ALG Intellectual Property, LLC (57) ABSTRACT There is provided a method of wirelessly connecting a communication device to other devices using a communication protocol, wherein the communication device searches for external devices known to the communication device by executing a search activity in which the search effort to be spent by the communication device increases with the number of known external devices to be searched, wherein the communication device adjusts the search effort spent on the search activity for each one of the external devices according to the relevance of that external device, with a higher relevance of the external device resulting in a higher search effort, and wherein the search effort is determined by at least one of the following parameters of the search activity: scheduling frequency, duty cycle and transmission power.

20 Claims, 3 Drawing Sheets (51) Int. Cl.
  *H04W 4/80* (2018.01)
  *H04W 72/04* (2009.01)
  *H04W 76/14* (2018.01)
  *H04W 84/18* (2009.01)
(52) U.S. Cl.
  CPC ....... *H04W 72/0473* (2013.01); *H04W 76/14* (2018.02); *H04M 2250/02* (2013.01); *H04W 84/18* (2013.01)

(56) References Cited

U.S. PATENT DOCUMENTS

| | | | |
|---|---|---|---|
| 9,451,391 B1 | 9/2016 | Brenner et al. | |
| 2008/0127223 A1* | 5/2008 | Zechlin | H04W 8/005 719/321 |
| 2010/0130131 A1* | 5/2010 | Ha | H04M 1/72412 455/41.3 |
| 2011/0153773 A1* | 6/2011 | Vandwalle | G06F 1/32 709/217 |
| 2013/0189924 A1* | 7/2013 | Pedro | H04W 4/80 455/41.1 |
| 2015/0350766 A1 | 12/2015 | Schobel et al. | |
| 2016/0095047 A1* | 3/2016 | Lee | H04W 8/005 370/328 |

FOREIGN PATENT DOCUMENTS

| | | |
|---|---|---|
| EP | 2701313 | 2/2014 |
| WO | 2016075208 | 5/2016 |
| WO | 2019029826 | 2/2019 |

\* cited by examiner

COMMUNICATION DEVICE HAVING A WIRELESS INTERFACE

The disclosure relates to a communication device, in particular a hearing device, having a wireless interface for wirelessly connecting the communication device to other devices.

One known approach for searching for other devices is to perform a round-robin search for all known devices (e.g., for devices which already have been previously connected to the communication device or which are at least paired with the communication device), which strategy, however, may cause high power consumption, a large average time to connect to a device or provides support only for few known devices.

Another known search strategy is to search for other devices only when presently not connected to any other device; such strategy is typically applied, for example, by a Bluetooth classic headset, which usually tries to connect to the single audio source to which it is paired and which stops searching once connected to the audio source.

U.S. Pat. No. 8,295,766 B2 relates to a Bluetooth classic headset using a search list when searching for paired Bluetooth classic audio sources, wherein the order of the search depends on the profile or protocol of the paired device and on the connection sequence in the sense that the most recently connected device is searched first.

U.S. Pat. No. 9,451,391 B1 relates to pairing management of Bluetooth devices, wherein the functionality of a device, the ownership of a device, the pairing history of the device, the location of the device and/or the type of use of the device may be taken into account.

EP 2 701 313 A1 relates to pairing management of Bluetooth devices, wherein the number of times the searching device was already connected to the respective paired device may be taken into account.

US 2015/0350766 A1 to a system wherein two audio sources, such as a smartphone and a personal computer, negotiate how to connect to a single audio sink, such as a headset.

EP 1 855 206 B1 relates to a method of sharing memory resources of a wireless portable electronic device.

It is an objective of the disclosure to overcome the drawbacks of the prior art and provide for an improved wireless communication device. In some embodiments of this disclosure, the disclosure provides for a wireless communication device that wirelessly connects to other devices in a reduced power consumption manner (e.g., a power-efficient manner), wherein the wireless communication device is enabled to communicate with a relatively large number of other devices (e.g., more than 3). It is a further objective to provide for an improved connection method.

According to some embodiments of the disclosure, this objective is achieved by methods as defined in claim 1, 17 and 25 and communication devices as defined in claim 31 to 33, respectively.

By controlling the search effort of the communication device according to the relevance of the previously connected or paired external device or according to the relevance of the communication protocol, respectively, the power consumption of the communication device may be reduced for handling of a given number of external devices, or, alternatively, for a given power budget the number of external devices to be handled may be increased.

Some embodiments of the disclosure are defined in the dependent claims.

Examples of the disclosure are illustrated by reference to the drawings, wherein.

The drawings have not necessarily been drawn to scale. Similarly, some components and/or operations may be separated into different blocks or combined into a single block for the purposes of discussion of some of the embodiments of the disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

The techniques introduced here can be embodied as special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is a non-transitory computer readable medium, where a non-transitory medium excludes a propagating signal.

Figure 1:
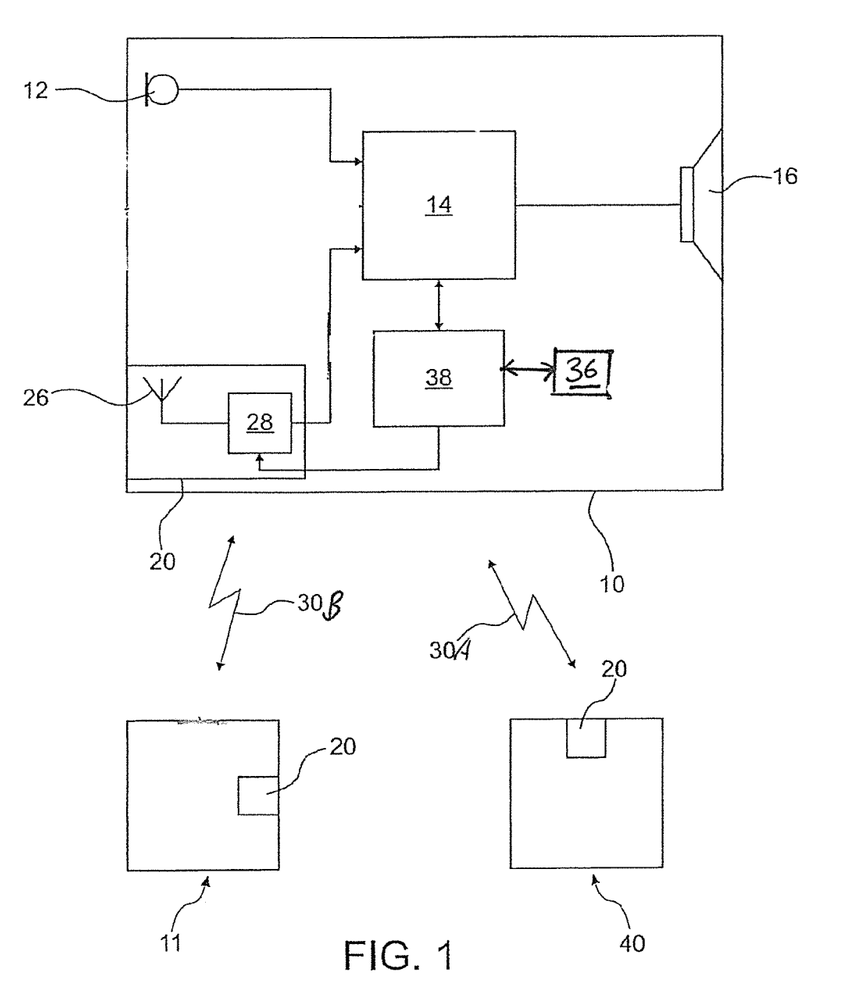
FIG. 1 is a schematic block diagram of an example of a hearing device.

FIG. 1 is a block diagram of an example of a first hearing device 10 to be worn at one ear of a user which typically is used together with a second hearing device 11 to be worn at the other ear of the user. The first and second hearing devices 10, 11 are ear level devices and together form a binaural hearing system. In some implementations, the hearing devices 10, 11 are hearing instruments, such as RIC (receiver in the canal), BTE (behind-the-ear), ITE (in-the-ear), ITC (in the canal) or CIC (completely-in-the-canal) hearing aids. However, the hearing devices, for example, also could be an auditory prosthesis, such as a cochlear implant device comprising an implanted cochlear stimulator and an external sound processor which may be designed as a BTE unit with a headpiece or as an integrated headpiece.

Hearing devices also may be a wireless headset, wireless earbuds, wireless earphones and other hearables, In the example of FIG. 1, the hearing devices 10, 11 are hearing aids comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals (these elements are shown in FIG. 1 only for the hearing aid 10).

The hearing aids 10, 11 comprise a wireless interface 20 comprising an antenna 26 and a transceiver 28. The interface 20 is provided for enabling wireless data exchange between the first hearing aid 10 and the second hearing aid 11 via a wireless link 30B which serves to realize a binaural hearing assistance system, allowing the hearing aids 10, 11 to exchange audio signals and/or control data and status data, such as the present settings of the hearing aids 10, 11.

The interface 20 is also provided for data exchange via a wireless link 30A from or to an external device 40, for example for receiving an audio data stream from an external device acting as an audio source, or data from a remote control device.

The interface 20, in some implementations, is configured to use the Bluetooth (BT) Classic protocol. In addition, the interface 20 may service other protocols in time-multiplex within the same frequency band (e.g. BT Classic and BT Low Energy (BTLE) and proprietary protocols, all in 2.4 GHz band). Further, the hearing device 10 may even use protocols in different frequency bands, for which purposes additional wireless interfaces (not shown) may be provided.

The hearing aids 10, 11 also comprise a control unit 38 for controlling operation of the hearing aids 10, 11, with the control unit 38 acting on the signal processing unit 14 and the transceiver 28, and a memory 36 for storing data required for operation of the hearing aid 10, 11 and data required for operation of the interface 20, such as pairing/network data.

Figure 2:
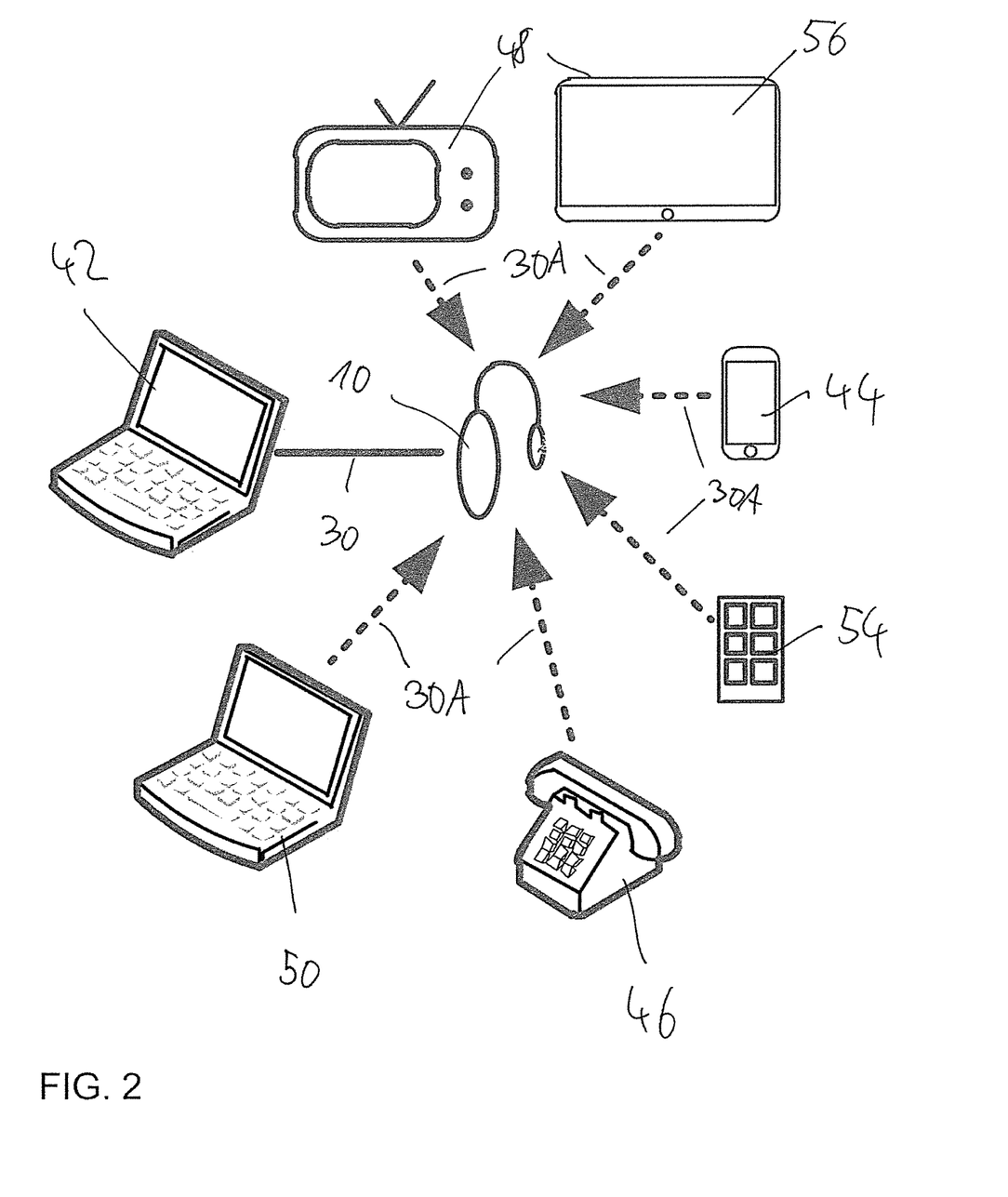
FIG. 2 is an illustration of an example of a use situation of a hearing device with a plurality of external devices.

In particular, the control unit 38 is configured to handle connectivity of the hearing device 10 via the wireless interface 20 to a plurality of external devices, like the devices shown in FIG. 2, according to certain rules, in particular with regard to the search activities of the hearing devices for the presence of external devices. The rules concerning search activities typically depend on whether the external device is known to the hearing device (e.g., the hearing device already has been connected at least once with the respective external device or is at least paired with the external device) or is unknown to the hearing device (e.g., neither paired nor having ever been connected with the external device).

In the example of FIG. 2, the hearing device 10 may be connected via connections 30A to a plurality of external devices like a first fitting station 42, a smartphone 44, a telephone device 46, a media streamer 48, a remote control 54, a tablet 56 and a second fitting station 50. Such connections may occur subsequently (e.g., one-after-the-other) or simultaneously (depending on the number of connections/devices the hearing device can handle at a time).

While hereinafter the disclosure will be illustrated by reference to hearing devices, it is to be understood that the disclosure also is applicable to communication devices in general, and not only to hearing devices. In some implementations, the communication device may be a smart watch.

For example, a hearing device may be connected via a Bluetooth classic link to audio sources like a wireless TV-set, a HiFi system, a doorbell, a smartphone, a personal computer, a remote microphone, a phone device or a car media system. In some implementations, the right audio source is connected to the hearing device at the right time so that, when needed, the respective sound can be promptly presented to the user of the hearing device. With a Bluetooth classic link, either the audio source or the audio sink may initiate the establishment of a connection. However, since the initiator of the connection establishment carries the power burden of the search for the other device, devices with limited power resources typically do not or only rarely initiate connections to other devices.

The disclosure primarily relates to the control of the effort spent by the communication device when searching for other wireless devices using a specific communication protocol. In this regard, one may distinguish three cases: (I) the communication device searches for an external device which is known to the communication device, (in some implementations a known device already has been previously connected at least once to the hearing device by using the respective communication protocol or is at least already paired with the hearing device by using the respective communication protocol) by executing a search activity in which the search effort to be spent by the communication device increases with the number of known external devices to be searched; (II) the communication device searches for a known external device by executing a search activity in which the search effort to be spent by the communication device is independent of the number of known external devices to be searched; (III) the hearing device searches for external devices not known to the communication device, e.g. a broadcast device. In case (I) the communication device controls the search effort according to the relevance of the known external device, and in cases (II) and (III) the communication device controls the search effort according to the relevance of the respective communication protocol, wherein in all cases a higher relevance results in a higher search effort.

Figure 3:
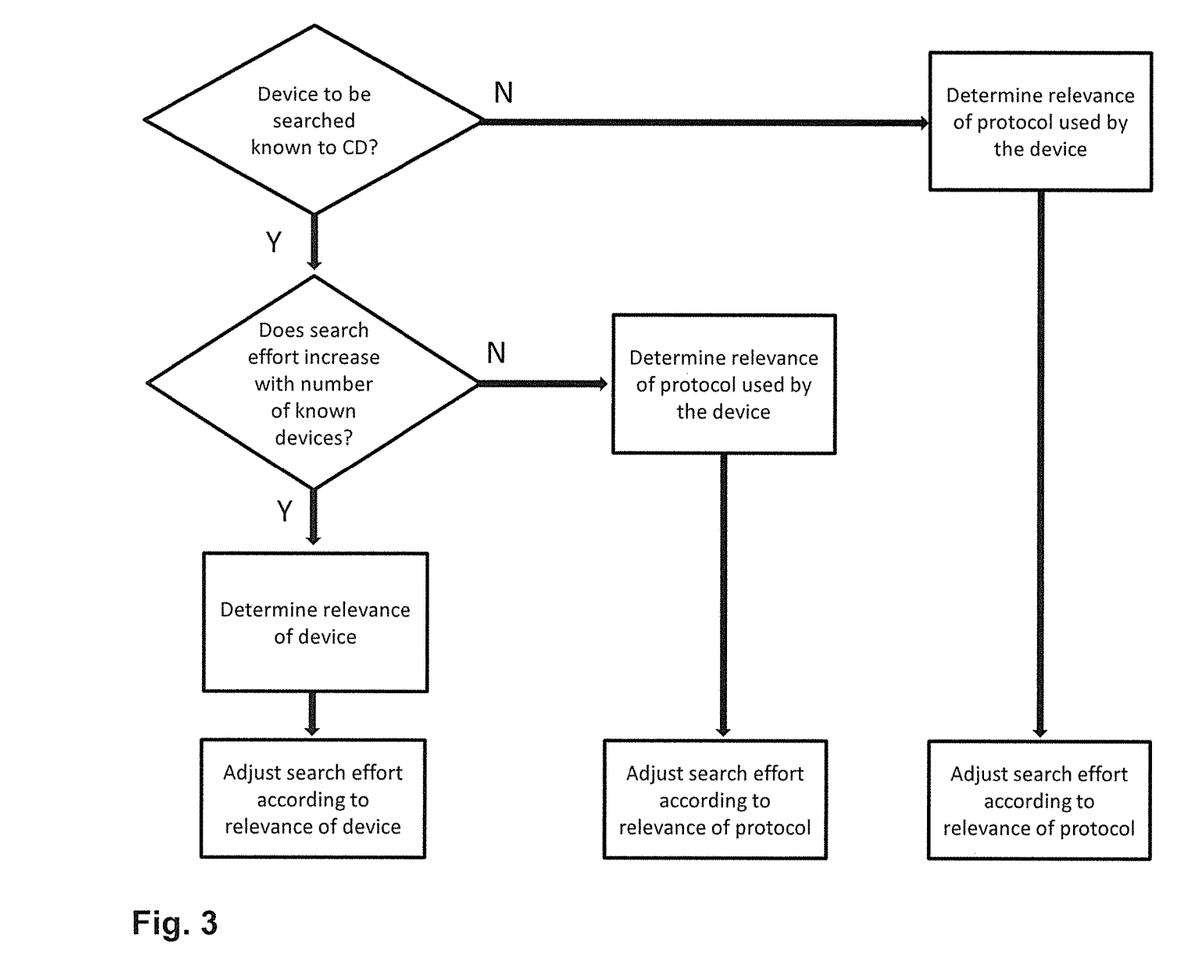
FIG. 3 is a flow diagram illustrating an example of a search for other devices by a communication device.

This strategy is illustrated by the flow diagram of FIG. 3, which shows an example of a search for other devices by a communication device CD.

A search by a communication device for external devices comprises (a) procedures to find a known and pre-selected external device, (b) procedures allowing the communication device to be found by external devices, and (c) procedures to find any external device.

In some implementations, a lower search effort leads to a larger average time until external devices are found or until external devices find the communication device. The above search methods may be categorized by the relationship between search effort and the number of external devices that are subject to the search: (1) Search for specific external devices where the search effort grows with the number of external devices being searched for; and (2) search for any external devices where the search effort is independent of the number of external devices being searched for.

In the Bluetooth ("BT") Classic protocol suite, "paging" is a procedure used to connect to a known external device that does page scan. Since paging addresses only a specific known BT Classic device, it is a procedure of type (a). The more frequently paging is done, the shorter is the latency to find the external device. The effort in scheduling and transmitted power grows with the number of external devices searched and with the duty cycle at which those searches are executed.

In the Bluetooth Classic protocol suite, "page scan" is a procedure allowing any external device that knows the communication device to find the communication device. Page scan is the counterpart to paging. A device doing page scan will receive paging from another device paging for it. The effort is independent of the number of external devices that may find the communication device through paging. The effort grows with the duty cycle at which page scan is executed. The higher the duty cycle, the lower the time a paging device will find the communication device. Page scan is a procedure of type (b).

In the Bluetooth Low Energy protocol suite, "directed advertising" is a procedure to connect to a known external device that does Bluetooth Low Energy scanning. It is a procedure of type (a). The more frequently directed advertising is done, the shorter the latency to find the external device. The effort in scheduling and transmitted power grows with the number of external devices searched and with the duty cycle at which those searches are executed.

In the Bluetooth Low Energy protocol suite, "scanning" is a procedure allowing the communication device to find any advertising external devices. It is therefore a procedure of type (c). The higher the scanning duty cycle, and thus the invested effort in scheduling and power, is the shorter is the average time to find an advertising external device.

In the Bluetooth Low Energy protocol suite, "advertising" allows any external device to find the communication device. It is a procedure of type (b). Advertising is the counterpart of scanning. The higher the advertising duty cycle or, equivalently, the lower the advertising interval and thus, the invested effort in scheduling and power, is the shorter is the average time to be found by scanning external devices.

There are several parameters involved in in the search procedure carried out by the hearing device which may be relevant with regard to the search effort: for example, the scheduling frequency, or repeat frequency, of the search activity, the duty cycle of the search activity and the transmission power applied in the search activity (a search of the communication device for other devices does not necessarily require transmission activities of the communication device, since, e.g., for listening to a broadcast transmission from an external device (e.g., when doing BT Low Energy "scanning") the communication device typically does not need to transmit any messages to the external device). The scheduling frequency indicates how often a given external device/audio source is searched for within a given time period; the duty cycle indicates how long a given audio source is searched for over a given time period; and the transmission power indicates how much transmission power is invested in the search. The search effort controlled according to the relevance of the external device or the relevance of the communication protocol may consist of one of these parameters alone or it may consist of a weighted combination of two of the parameters or of all parameters.

In some implementations, when searching for a known Bluetooth classic device, the search effort may be determined by the duty cycle of the paging action; and, when searching for a Bluetooth low energy broadcasting device, the search effort may be determined by the duty cycle of the scanning action.

In some implementations, the external device is an audio source, such as a wireless microphone, a phone device, a media player, a TV set, an audio streaming device, a doorbell or a fire or smoke alert device. However, the external device could also be, for example, an accessory device for a hearing device, such as a remote control or a fitting station.

In some implementations, the relevance of the known external device may be determined by at least one of the following parameters: (1) the age of last usage of the external device by the communication device; (2) a relevance value previously assigned to the external device by the user, (3) a physical proximity of the external device to the communication device which may be detected "out-of-band"; (4) the number of devices other than the external device connected to the communication device; and (5) knowledge of a search activity of the external device for the communication device.

By assigning a certain relevance to the known external device or to the communication protocol, the search effort may be controlled in such a manner that the search resources can be primarily spent on the most promising external device (or on the most promising communication protocol) to avoid a waste of resources ("most promising" in this respect means "having the highest potential value" for the communication device/hearing device). In particular, the connection/use history of external devices may provide for an indication of the potential value of the respective external device.

For example, the hearing devices of a user may have been paired with the public access system of a conference center which will not be visited again—or at least not in the near future—by the user; it may have been paired with the TV-streaming device of a family member of the user who was visited by the user; it may have been paired with a remote microphone used in a weakly evening course; and it may have been paired with the smartphone of the user which is used daily. For example, the user typically would expect a relatively short reconnection time for the frequency used devices, while he would accept a longer reconnection time for rarely used devices. Thus, the search resources should be primarily spent on the frequently used devices, which, according to the invention, could be achieved by awarding a relatively high relevance to the frequently used devices.

Such behavior may be obtained in the above use history example, if the relevance awarded to the respective audio source is the higher the lower the age of the last usage of this audio source is. For example, the relevance of the external device may be set to decrease according to a logarithmic function. "Usage" in the broadest sense may mean "getting a benefit from the interaction with a source". For example, "usage" may be implemented by "connection", so that the "age of the last usage" may correspond to the age of the last connection, e.g., the time having passed since the last connection. The time having passed since the last connection may be determined from the difference between the current date of the hearing device and the last date of connection known by the hearing device for the respective audio source.

For example, a calendar may be used for determining such time difference. Since some embedded devices may not have a precise time calendar available, a simplified calendar may be implemented as a counter of some event which frequency and regularity is reasonably suited for the purpose of learning the age of last usage. In other words, several events—rather than time itself—may be counted for the purpose of creating such simplified calendar. For example, such events may be: a power charging event (for example a "device date" increments each time the hearing device starts charging its battery); for a non-rechargeable hearing device the event may be change of a (non-rechargeable) battery or reaching of a given threshold of the remaining battery capacity (for example, the "device date" increments each time the battery is replaced). Further, the event may be a turning on of the hearing device (e.g., the "device date" increments each time the hearing device is turned on). In the most general case, any event resulting in change in the condition or context of the hearing device may be used, for example, a gesture on a user interface (for example, the "device date" increments each time a certain button on the hearing device is pressed by the user), or any connection, wired or wireless, of the hearing device with another device.

For example, the hearing device may manage a list of audio sources which is expected to connect with and each time the hearing device finds a given audio source, it resets a "failed search counter" for a search in one of the audio sources when it finds this audio source and at the same time increases the "failed search counter" for all other sources in the list. The search effort for a certain audio source then decreases with the "failed search counter" of that audio source, for example, in a logarithmic fashion. For example, if the "failed search counter" is less than the "number of audio sources in the list", the highest search effort may be applied, whereas a medium search effort may be applied if the "failed search counter" is less than twice the "number of audio sources", a low search effort may be applied if the "failed search counter" is less than four times the "number of sources", and a very low search effort may be applied if the "failed search counter" is larger or equal to four times the "number of sources".

With regard to the cumulated vain search effort, the age of last usage may be set to a value which is the lower the lower the cumulated vain search effort for the external device is. In this case, a cost is associated with the cumulated vain search effort, e.g., the hearing device keeps track of the cumulated effort invested in searching for a certain audio source and resets this effort when the audio source is found. The search effort, for example, may decrease in a logarithmic fashion with the "cumulated vain search effort". Several events may be counted as "vain search effort", for example the number of days of vain search, the number of seconds of vain search, the number of mWh of vain search, etc.

A sequence of last use of a plurality of devices may be obtained by sorting the paired audio sources by their "last recent usage" (e.g., when used, a device is set first in the list and therefore, after some time, the last device in the list is the least recently used device); "usage" in this example may be implemented by "connection", so that the least recently usage corresponds to the least recent connection. The search effort spent on a certain audio source then decreases with its position in the list.

As already mentioned above, the relevance of an external device may be determined by a relevance value assigned to the external device by the user. For example, some audio sources of a list of known devices may be marked or sorted by relevance for determining the search effort for the respective audio source, with the hearing device adapting its reconnection effort according to such relevance information. For achieving such user designation, the user may use a device having a sufficiently rich user interface, for example a smartphone connected to the hearing device, wherein the user may designate one device (or several devices) as "favorite" device(s). Alternatively, the user may class the paired devices by "relevance" categories, for example one "favorite" device, not more than two "important" devices and not more than three "less important" devices. Alternatively, the devices may be sorted by relevance, e.g., each device is awarded with a different relevance level. However, since the relevance of a device to the user may change with time, while the user may forget to update this information (for example, when he changes one of the paired devices), it is preferable that the relevance of a certain external device is automatically reduced as a function of the time having passed since the assignment of the relevance value to that device.

As already mentioned above, a further relevance criteria may be a "proximity" of the external device. For example, such proximity of a certain external device may be derived from the fact that the external device is not only known from the searched communication protocol to the hearing device but in addition through another channel, namely through a second protocol different from the searched protocol. For example, an audio source may be paired not only for Bluetooth Classic but also for Bluetooth LE, wherein the latter fact may increase the relevance—and thus the search effort—for a Bluetooth Classic search for that audio source (for example, such device which is paired for both Bluetooth Classic and Bluetooth LE is likely to be the user's personal smartphone and thus is an important device). In some implementations, the hearing device may detect that a certain audio source, which is presently not connected for Bluetooth Classic (but which is paired for Bluetooth Classic) is in "proximity" to the hearing device, for example by detecting that that device is connected to the hearing device via Bluetooth LE, such device may be awarded high relevance, since it is likely that this device will be available also for a Bluetooth Classic connection, so that a high search effort should be spent.

In some implementations, the proximity of an external device, when positively detected, may outweigh other relevance criteria, if any.

Also, as already mentioned above, the relevance of the known external device may depend on the number of devices other than the external device which are presently connected to the hearing device; in some implementations, the relevance of the external device is the higher the lower the number of devices connected to the hearing device is.

Further, as already mentioned above, the relevance of the external device may depend on a search activity of the external device using the searched protocol. According to one example, the relevance of the external device may be increased when a search activity of the external device is detected by the hearing device, based on the consideration that it is highly likely to become connected to a device which is already searching on its own for other devices. According to an alternative embodiment, the relevance of the searching external device may be decreased (e.g., the search effort may be decreased), based on the consideration that the hearing device may wait until the connection to the searching external device is established based on the search activity of the external device.

In some implementations, the hearing device may suggest to the user to remove a pairing entry of an external device when the relevance of the external device falls below a certain threshold, for example when the age of last usage of that external device exceeds a certain threshold (which may be an indication that this external device is no longer of interest). Alternatively, such pairing entry removal may be performed autonomously by the hearing device without user interaction. By removing devices from the list of paired devices based on the present relevance of the device, the hearing device may be prevented from spending search effort on devices which are no longer of interest.

The above described concept of controlling the search effort for a known device according to the relevance of that device may be applied similarly also to the case when searching for any device using a given communication protocol (e.g., when trying to connect to wireless partners of a given wireless technology) by assigning a certain "relevance" to the given communication protocol (rather than to a known device), as will be explained in more detail hereinafter.

In some implementations, one criterion for determining the relevance of the protocol may be the age of last usage of any device using that communication protocol by the hearing device, with the relevance (and thus the search effort) being the higher the lower the age of last usage of any device of that communication protocol is. In some implementations, the age of last usage is determined by the age of the last connection of any device using that communication protocol to the hearing device, wherein the age of last connection, in some implementations, is determined by the time having passed since the last connection.

In Table 1 the current spent for connection to devices of a certain proprietary protocol (more specifically, primarily the current spent on the scanning action) and the resulting average reconnection duration are shown for several ages of last connection to a device using that proprietary technology.

|  | Current spent for connection to Roger sources | Average reconnection duration |
|---|---|---|
| Standard behaviour (without adaptation) | 20 µA | X seconds |
| Roger sink (e.g., hearing device "HD") has not met any Roger source since more than 4 weeks | 10 µA | 2 * X seconds |
| Roger sink (e.g., HD) has not met any Roger source since more than 12 weeks | 5 µA | 4 * X seconds |
| Roger sink (e.g., HD) has met a Roger source since less than 1 hour | 40 µA | ½ * X seconds |

In Table 2 a similar example is shown for Bluetooth LE, wherein the current spent for advertisement is shown together with the advertisement period and the resulting average reconnection duration.

|  | Current spent | Advertisement period | Average reconnection duration |
|---|---|---|---|
| Default behavior | 10 µA | 150 ms | 500 ms |
| No Bluetooth LE devices connected since more than 4 weeks | 5 µA | 300 ms | 1 seconds |
| No Bluetooth LE devices connected since more than 12 weeks | 2.5 µA | 600 ms | 2 seconds |
| Bluetooth LE met connected since less than 1 hour | 20 µA | 80 ms | 250 ms |

Alternatively or in addition to the age of last usage the relevance may be based on the number and/or type of devices paired with the hearing device and using the searched communication protocol. For example, if the pairing table of the hearing device is found to be empty after a pairable time window of the hearing device, the relevance of the protocol (and thus the search effort spent in searching for devices using that protocol) may be reduced, compared to the case that the pairing table of the hearing device is found to be not empty. In particular, the search effort may be reduced to zero if the pairing table of the hearing device is found to be empty after the pairable time window of the hearing device. According to a variant, the reduction of the search effort may be carried out only if the pairing table of the hearing device is found to be empty after a pairable time window of the hearing device for a certain type of devices of the searched protocol, e.g., in this case it does not matter whether the pairing table is empty for other types of devices or not. For example, the hearing device may have a split pairing table with separate pairing tables for different types of devices, as described in international patent application PCT/EP2016/075208; in such case, only one of the pairing tables would be considered for the decision as to whether the search effort should be reduced or not.

For example, a hearing device acting as a Bluetooth LE advertiser may stop advertising if it is not paired with any device when it is no longer pairable (e.g., when the pairable time window has closed). Alternatively, this may apply only if the hearing device is not paired with a Bluetooth LE device of a certain type, while it does not matter whether it is paired with other types of Bluetooth low energy devices.

In Table 3 an example of such control strategy is shown for Bluetooth LE.

|  | Current spent | Advertisement period | Average reconnection duration |
|---|---|---|---|
| During the few first minutes after turn on (e.g. during pairable window) | 10 µA | 150 ms | 500 ms |
| After pairable window, if Bluetooth LE pairing table is empty | 0 µA | No advertisement | No reconnection possible (since no pairing) |
| After pairable window, if "Personal" Bluetooth LE pairing table is empty, and "Fitting and service" Bluetooth LE pairing table is not empty | 2.5 µA | 600 ms | 2 seconds |

As already mentioned above, a further criterion for determining the relevance of the search protocol may be the time having passed since the last turning on of the hearing device, wherein the relevance (e.g., the search effort) is higher during an initial time period (which have a length of a few minutes) following the turning-on of the hearing device, compared to later time periods following the initial time period. Typically, such initial time period may equal the "pairable time window" during which the hearing device may pair with other devices.

An example is shown in Table 4, wherein during the first few minutes after turning on of the hearing device the search effort is about twice the search effort during times after the pairable window.

|  | Current spent | Advertisement period | Average reconnection duration |
|---|---|---|---|
| During the few first minutes after turn on (e.g. during pairable window) | 20 µA | 80 ms | 250 ms |
| After pairable window (default) | 10 µA | 150 ms | 500 ms |

According to one embodiment, the searched communication protocol may be a broadcast protocol, e.g., the external device/audio source is a broadcast device. Broadcast devices announce their presence through repeated transmission of advertisements or beacons, so that a device searching the broadcast source has to scan for such advertisements to become aware of the availability of a broadcast source. In this case, the relevance of the communication protocol (e.g., the search effort for a broadcast source using this protocol) is determined by the time having passed since the last use of a broadcast audio signal of the broadcast protocol by the communication device/hearing device, wherein the search effort/relevance is the higher the shorter this time is. In some implementations, the search effort is determined by the duty cycle of the scanning action in case that the protocol is Bluetooth classic.

Consequently, a hearing device searching for a broadcast audio source would adjust its scanning duty cycle such that it uses a high duty cycle when the time elapsed since it has rendered audio signals from a broadcast source is short and that it uses a low duty cycle when the time elapsed since it has rendered audio signals from a broadcast audio source is long. Thus, a hearing device that has not been listening to broadcast sources for a long time may miss the beginning of a broadcast announcement, but it will hook on subsequent broadcast announcements much faster as long as not much time elapses between subsequent audio broadcasts.

It has to be noted that in all embodiments the lowest conceivable search effort may mean that there is no search activity at all, e.g., a search effort of "zero" corresponds to no search at all.

The phrases "in some implementations," "according to some implementations," "in the implementations shown," "in other implementations," and generally mean the particular feature, structure, or characteristic following the phrase is included in at least one implementation of the disclosure, and may be included in more than one implementation. In addition, such phrases do not necessarily refer to the same embodiments or different implementations.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The invention claimed is:

1. A method of wireles sly connecting a communication device to other devices using a communication protocol,
   wherein the communication device searches for external devices known to the communication device, so as to find a pre-selected one of the external devices known to the communication device, by executing a search activity in which search effort to be spent by the communication device increases as a number of known external devices to be searched increases, wherein the search activity of the communication device comprises procedures to find a known and pre-selected external device, wherein a device known to the communication device is a device which has been previously connected at least once to the communication device based on the communication protocol or is at least paired with the communication device based on the communication protocol;
   wherein the communication device adjusts the search effort spent on the search activity for each one of the external devices according to a relevance of each one of the external devices, with a higher relevance of an external device included in the external devices resulting in a higher search effort;
   wherein the search effort is determined by at least one of the following parameters of the search activity: scheduling frequency, duty cycle, or transmission power; and
   wherein the relevance of the external device is determined by at least one of (1) an age of last usage of the external device by the communication device, (2) a relevance value previously assigned to the external device by a user, (3) a physical proximity of the external device to the communication device, (4) the number of devices other than the external device connected to the communication device, (5) knowledge, by the communication device, of a search activity by the external device for the communication device, or (6) a relevance of services provided by the external device.

2. The method of claim 1, wherein the search activity comprises Bluetooth classic paging or Bluetooth Low Energy directed advertising.

3. The method of claim 2, wherein the search effort is determined by a selection of the duty cycle of a Bluetooth Classic paging action.

4. The method of claim 1, wherein the relevance of the external device is higher the lower the age of last usage is.

5. The method of claim 1, wherein the age of last usage is determined by an age of last connection.

6. The method of claim 5, wherein the age of last connection is determined by an amount of time having passed since a last connection or an estimation of the amount of time.

7. The method of claim 6, wherein the relevance decreases at a rate which is linear or less than linear with the amount of time having passed since the last connection.

8. The method of claim 7, wherein the relevance decreases logarithmically with the amount of time having passed since the last connection.

9. The method of claim 1, wherein the relevance of the external device is higher the shorter an amount of time having passed since the assignment of the relevance value is.

10. The method of claim 1, wherein it is determined that there is the physical proximity of the external device when it is detected that the external device is already paired with or connected to the communication device based on second communication protocol different from the communication protocol of the search activity.

11. The method of claim 1, wherein the physical proximity of the external device to the communication device, when positively detected, outweighs other relevance criteria, if any.

12. The method of claim 1, wherein the relevance of the external device is higher the lower the number of devices connected to the communication device other than the external device is.

13. The method of claim 1, wherein the relevance of the external device is increased when a search activity of the external device using that communication protocol is detected.

14. The method of claim 1, wherein the communication device suggests to the user, or autonomously decides, to remove a pairing entry of the external device when the relevance of external device falls below a certain threshold.

15. A method of wireles sly connecting a communication device to other devices using a communication protocol,
   wherein the communication device searches for external devices known to the communication device, so as to find a pre-selected one of the external devices known to the communication device, by executing a search activity in which a search effort to be spent by the communication device is independent of a number of known external devices to be searched, wherein the search activity of the communication device comprises procedures to find a known and pre-selected external device, wherein a device known to the communication device is a device which has been previously connected at least once to the communication device based on the communication protocol or is at least paired with the communication device based on the communication protocol;

wherein the communication device adjusts the search effort spent on the search activity according to a relevance of the communication protocol, with a higher relevance of the communication protocol resulting in a higher search effort;

wherein the search effort is determined by at least one of the following parameters of the search activity: scheduling frequency, duty cycle, or transmission power; and wherein the relevance of the communication protocol is determined by at least one of (i) an age of last usage of an external device included in the external devices using that communication protocol by the communication device, (ii) the number of external devices known to the communication device and using that communication protocol, or (iii) a relevance of services provided by external devices known to the communication device and using that communication protocol.

16. The method of claim 15, wherein the search activity comprises Bluetooth Low Energy advertising.

17. The method of claim 16, wherein the search effort is higher the lower the age of last usage is.

18. The method of claim 16, wherein the age of last usage is determined by an age of last connection.

19. The method of claim 18, wherein the age of last connection is determined by an amount of time having passed since a last connection.

20. A communication device comprising a wireless communication interface using a communication protocol for connecting to other devices, wherein the communication device is configured to:

search for external devices known to the communication device, so as to find a pre-selected one of the external devices known to the communication device, by executing a search activity in which search effort to be spent by the communication device increases as a number of known external devices to be searched increases, wherein the search activity of the communication device comprises procedures to find a known and pre-selected external device, wherein a device known to the communication device is a device which has been previously connected at least once to the communication device based on the communication protocol or is at least paired with the communication device based on the communication protocol; and adjust the search effort spent on the search activity for each one of the external devices according to a relevance of each one of the external devices, with a higher relevance of an external device included in the external devices resulting in a higher search effort;

wherein the search effort is determined by at least one of the following parameters of the search activity: scheduling frequency, duty cycle, or transmission power; and wherein the relevance of the external device is determined by at least one of (1) an age of last usage of the external device by the communication device, (2) a relevance value previously assigned to the external device by a user, (3) a physical proximity of the external device to the communication device, (4) a number of devices other than the external device connected to the communication device, (5) knowledge, by the communication device, of a search activity by the external device for the communication device, or (6) a relevance of services provided by the external device.

* * * * *